Figure 1:
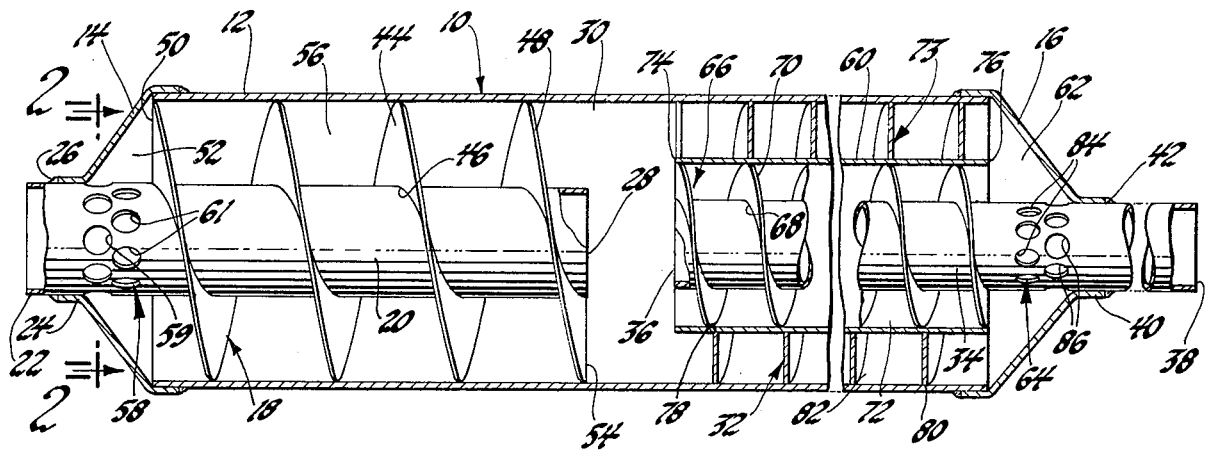

UNITED STATES PATENT
Parker
[19]
[11] 3,913,703
[45] Oct. 21, 1975

[54] SINGLE INNER ASSEMBLY WAVE INTERFERENCE SILENCER

[75] Inventor: William J. Parker, Flint, Mich.

[73] Assignee: General Motors Corporation, Detroit, Mich.

[22] Filed: May 3, 1974

[21] Appl. No.: 466,618

[52] U.S. Cl. ............................ 181/44; 181/67
[51] Int. Cl. ................................. F01n 1/00
[58] Field of Search ......... 181/33 D, 41, 44, 46, 66, 181/67

[56] References Cited
UNITED STATES PATENTS
| 1,157,256 | 10/1915 | Schmitt | 181/67 |
| 2,359,365 | 10/1944 | Katcher | 181/67 |
| 3,700,069 | 10/1972 | Rausch et al. | 181/44 X |

FOREIGN PATENTS OR APPLICATIONS
| 460,148 | 1/1937 | United Kingdom | 181/67 |
| 123,995 | 5/1917 | United Kingdom | 181/67 |
| 804,593 | 8/1936 | France | 181/67 |

Primary Examiner—Joseph W. Hartary
Assistant Examiner—John F. Gonzales
Attorney, Agent, or Firm—J. C. Evans

[57] ABSTRACT

A wave interference silencer having an inner tube and an outer concentric tube with a helical baffle on the inner tube to define an outer flow path through the space between the concentrically located inner and outer tubes of a length greater than the length between opposite open ends of the inner tube and wherein a plurality of holes are located in the inner tube between the opposite ends thereof at a noise interaction point between exhaust flow through the inner tube and exhaust flow through the outer helical path. The cross-sectional flow area of the holes between the inner flow path and the outer flow path are substantially equal to the cross-sectional flow area through the inner tube to allow unrestricted noise interaction with less turbulent noise generated at the interaction area of the inner and outer helical flow path of a wave interference silencer.

5 Claims, 6 Drawing Figures

SINGLE INNER ASSEMBLY WAVE INTERFERENCE SILENCER

This invention relates to wave interference silencer devices of the type including a pair of concentric pipes or tubes with a baffle in the form of a helix therebetween to attenuate a given noise frequency of exhaust flow through the inner and outer flow paths of the silencer and more particularly to systems of this type having means to produce broad range attenuation characteristics.

In order to obtain attenuation of sounds in ducts or pipes, it is known to provide an auxiliary duct of a different length of sound path than that through a main duct. One arrangement for achieving attenuation by this approach is to have two concentric tubes or pipes with a dividing baffle therebetween in the form of a helix to produce a first open ended path through the inner tube and a second helical outer flow path of greater length than the inner path to produce a destructive interference by a pressure peak traveling along the longer outer flow path meeting a rare fraction in the inner tube.

In order to achieve broad band attenuation by use of wave interference type silencers it is necessary to include a number of sections combined in series with each section adding an attenuation characteristic scaled for a particular frequency in accordance with its length.

An object of the present invention is to provide an improved attenuation of noise utilizing wave interference silencer theory by use of a single inner tube having a helical flow path formed on the outer surface thereof by means of a baffle and wherein broadened attenuation is produced by means of a plurality of holes located at sound interaction points along the length of the inner tube so as to produce noise interference at multiple points along the silencer without requiring a plurality of separate wave interference silencers.

Yet another object of the present invention is to provide an improved silencer assembly having a minimum number of parts and means to produce improved attenuation of a wide range of sound frequencies in an engine exhaust.

Still another object of the present invention is to provide an improved wave interference silencer device of the type including concentric tubes with an inner tube having opposite open ends defining a first flow path and a helical baffle interposed between the first and second concentric tubes to define a longer outer flow path to produce an out-of-phase relationship in velocity through the inner tube and the outer flow paths for attenuating noise and to improve the attenuation of noise in such devices by the provision of a set of holes located at an intermediate point between the ends of the inner tube of produce good communication between inner and outer flow paths in the wave interference device at a sound interaction point between the two paths with the hole set being sized to reduce back pressure through the first and second flow paths and configured so that there is less turbulent noise generated at the interaction area between the inner and outer flow paths.

Further objects and advantages of the present invention will be apparent from the following description, reference being had to the accompanying drawings wherein a preferred embodiment of the present invention is clearly shown.

Figure 2:
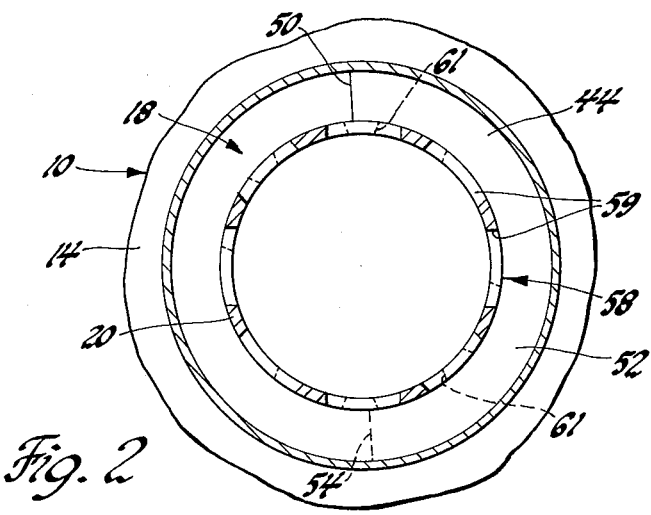
Figure 3:
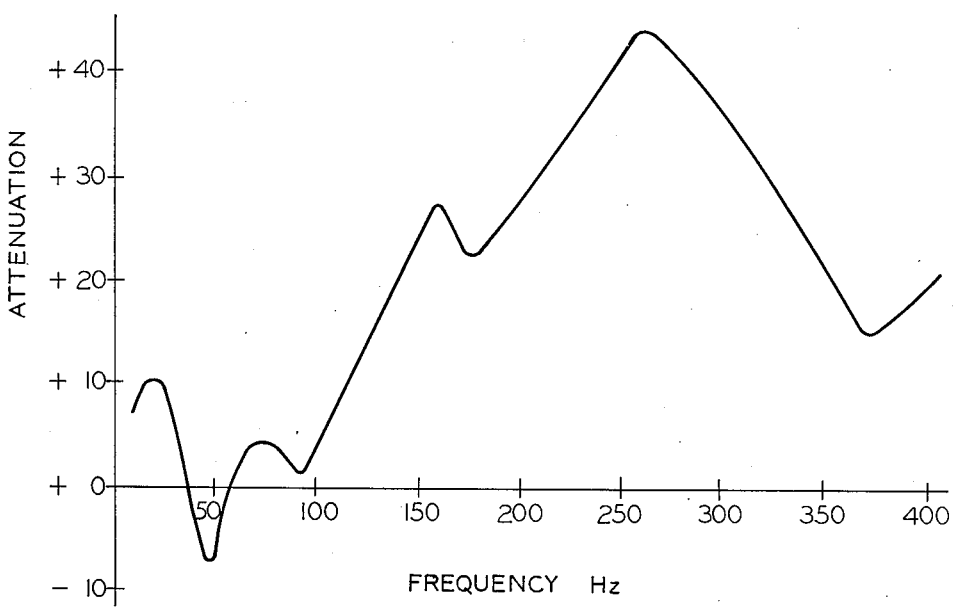
Figure 4:
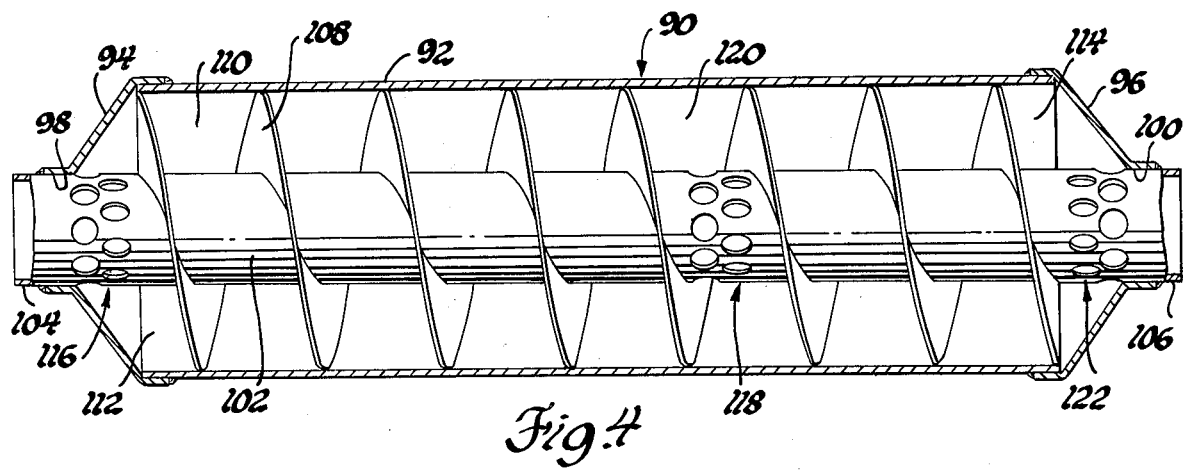
Figure 5:
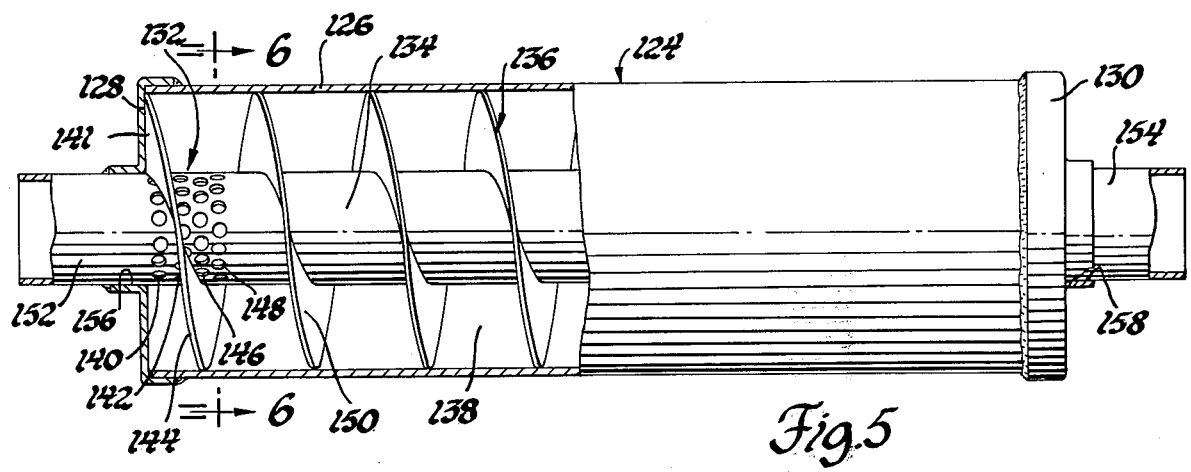
Figure 6:
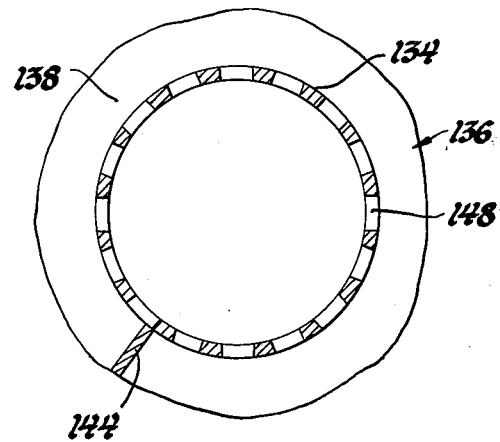

In the Drawings:

FIG. 1 is a longitudinal sectional view of a silencer;
FIG. 2 is an enlarged sectional view on line 2—2 of FIG. 1;
FIG. 3 is an attenuation curve of the invention;
FIG. 4 is a sectional view of another embodiment of the invention; and
FIGS. 5 and 6 are sectional views of a third embodiment of the invention.

FIG. 1 shows a silencer 10 having an outer tube or casing 12 with conically formed end closures 14, 16 at opposite ends thereof. A first wave interference silencer 18, modified to include the present invention is located at the inlet end of the outer casing 12 as defined by the closure 14. It includes an inner open-ended tube 20 having an inlet end 22 thereof adapted to be connected to an exhaust pipe of an engine. An annular extension flange 24 on the conical end closure 14 engages the outer periphery of the tube 20 at the inlet end 22 thereof and is sealed with respect thereto by an annular weld segment 26.

The outlet end 28 of the tube 20 is located immediately upstream of an open volume 30 in the outer casing 12 which is located upstream of the inlet end of a second wave interference assembly 32 also modified to include the present invention. Assembly 32 is located within the outer casing 12 upstream of the end closure 16. The wave interference assembly 32 includes an inner open-ended tube 34 of smaller diameter than tube 20 and located coaxially thereof. It includes an inlet end 36 located in alignment with the outlet end 28 of the tube 20 and an outlet end 38 that is adapted to be connected to a tailpipe of a vehicle. The outlet end 38 is supported by an annular flanged extension 40 on the conical end closure 16 that engages the outer surface of the outlet end 38 and is sealed with respect thereto by means of an annular weld bead 42.

The length of the inner tube 20 is selected to produce a reflected negative pulse back to the inlet manifold of the engine for scavenging exhaust flow therefrom. Furthermore, it supports a helical baffle 44 on the outer surface thereof which has an inner edge 46 in engagement with the outer surface of the tube 20 and an outer edge 48 thereon in engagement with the inner surface of the outer casing 12. The baffle 44 includes an inlet end 50 in communication with an annular cavity 52 formed by the closure 14 and an outlet end 54 at the open volume 30. The helical baffle 44 forms an elongated flow path 56 which winds around the outer circumference of the tube 20 to have a length greater than the length of the inner tube 20.

In accordance with the present invention, the wave interference silencer 18 includes a set of holes 58 in the tube 20 intermediate the ends 22, 28 and at the location of the cavity 52. These holes 58 have a total cross-sectional flow area approximately equal to the cross-sectional flow area of the tube 20 and serve as the entrance to the elongated path 56 formed by the helical baffle 44. In accordance with known wave interference theory, the length of the path 56 is selected to produce an attenuation of a first range of sound frequencies in the engine exhaust as the exhaust passes through the wave interference silencer 18. This silencing action is in addition to the function of the tuned tube 20 to produce a negative scavenging pulse at the exhaust port of the engine. The set of holes 58 are located at what would normally be a cut-out gap in tube 20 to allow sound communication from an exhaust pipe to both path 56 and tube 20. The provision of a hole set 58 means that a single tube can be utilized as the inlet to assembly 10 and the straight sound path of silencer 18. Thus parts are eliminated. Furthermore, the hole set 58 is located as a group at a good sound interaction point between path 56 and interior of tube 20 so that attenuation of sound is produced by virtue of destructive interference attained by the flow path length relationship between path 56 and the length of tube 20 between hole set 58 and end 28. Since there is no abrupt gap at the entrance to path 56 and the entrance to tube 20 as is normally the case in wave interference silencers, the arrangement produces less back pressure and less turbulent noise is generated at the interacting regions between path 56 and the tube 20. The total open area of the holes is approximately equal to the flow area through tube 20 so that the hole area is more transparent to allow improved noise interaction and consequent improved attenuation.

In the illustrated working embodiment the hole set 58 includes a first row of eight equally circumferentially spaced holes 59 each of a 0.50 inch diameter. It also includes a second row of eight equally circumferentially spaced holes 61 also of 0.50 inch diameter but in staggered alignment with the holes 59. The center line of holes 59 are spaced 0.50 inches from the center lines of holes 61. The tube 20 has a 1.875 inch O.D. and is 10 inches long. The casing 12 has a 4.50 inch O.D. The baffle 44 has a height of 1.25 inches; a 1.875 inch I.D.; and a pitch of 2.12 inches and an end-to-end dimension of 7.5 inches.

In this embodiment of the invention, the second wave interference silencer section 32 is further modified as compared to the wave interference silencer section 54 in the first embodiment. It includes a second tube 60 located radially outwardly of and in spaced relationship to the tube 34. Tube 60 is open ended and extends from the upstream end 36 of the tube 34 to a point immediately upstream of an annular cavity 62 formed by the end closure 16. The annular cavity 62 is communicated through a set of holes 64 with the interior of tube 34 upstream of end 38. The silencer 32 includes a first helical baffle 66 extending about the outer surface of the tube 34 between the inlet end 36 thereof and the cavity 62. It includes an inner edge 68 thereon in engagement with the outer surface of the tube 34 between the aforementioned points and an outer edge 70 that is in engagement with the inner surface of the tube 60 thereby to define an elongated helical groove or flow path 72 from the inlet end 36 of the tube 34 to the cavity 62. Further, the assembly 32 includes an outer baffle 73 formed as a helix and wound around the outer surface of the tube 60 between the inlet end 74 thereof and the outlet end 76 thereof to the cavity 62. The vane includes an inner edge 78 thereon in engagment with the outer surface of the support tube 60 and an outer edge 80 in engagement with the inner surface of the outer casing 12 to define an elongated helical flow path 82 from the open volume 30 to the cavity 62. In this embodiment, each of the elongated paths 72, 82 within the wave interference silencer section 32 serve to attenuate second and third ranges of sound frequencies in addition to the attenuation effect produced by the elongated flow path 56 in the wave interference silencer section 18.

The set of holes 64 serve to communicate open ends of the elongated helical paths 72, 82 with the outlet end of the tube 34. As in the case of the holes in the upstream wave interference silencer 18, these holes are sized to produce a transparent communication between the outer flow paths and the path defined between the ends of the tube 34. Preferably, the holes have a cross-sectional flow area which is at least equal to the flow area through the tube 34. In the illustrated embodiment, the set of holes 64 includes a first row of eight holes 84, which are equally circumferentially spaced around the tube 60 each having a diameter of 0.38 inches. The set 64 further includes a second row of eight equally circumferentially spaced holes of 0.38 inches diameter and in staggered alignment with the holes 84 with the center line of the row of holes 84 being spaced one-half inch from the center line of the row of holes 86. The set of holes 64 are located at a position which normally would be in the form of an open gap in tube 34 in presently known wave interference silencer arrangements. The provision of the hole set 64 means that a single tube 34 can be utilized as the short path of the wave interference silencer 32 as well as a tube extension from the silencer assembly 10 that is adapted to be connected to the tailpipe of a vehicle. Thus, this arrangement further eliminates parts. Furthermore, the hole set 64 is located at a sound interaction point between the outer helical paths 72, 82 and the interior of the tube 34 between opposite ends of an acoustical path from end 36 to holes 64 so that attenuation of sound is produced by wave interference but with a reduction of back pressure in the silencer assembly and less turbulent noise as flow is directed therethrough. Thus, smaller diameter inner pipes may be used as compared to those found in present wave interference silencers.

In the downstream silencer section 54, the tube 60 in one working embodiment has a diameter of 1.375 inches and is sixteen inches long. The inner helical baffle 66 is 8.50 inches end-to-end and has a height of 0.610 inches and a 1.375 inch I.D. It has a pitch of 1.506 inches. The outer baffle 73 is also 8.50 inches end-to-end and has a height of 0.859 inches and a 2.625 inches I.D. It further includes a pitch of 1.167 inches.

In a silencer assembly 10 of the type described above there is an improved attenuation of broad range of sound frequencies illustrated in FIG. 3. The attenuation effect of the modified wave interference silencers in the assembly are shown by an attenuation curve taken at a point one inch from the outlet tube weld. It shows a decibel attenuation scale from −10 to +40 db with silencing effectiveness being maintained from 50 Hertz through 350 Hertz.

A second embodiment of the invention is illustrated in FIG. 4, which shows a silencer 90 having an outer tube 92 with end plates 94, 96 at opposite ends thereof. Bores 98, 100 are formed in the enclosures 94, 96 respectively. A single inner tube 102 is directed through the bores 98, 100 to be supportingly received by the end plates 94, 96 thereby to locate the inner tube 102 concentrically of and radially inwardly spaced from the outer tube 92 between the end plates 94, 96 thereon. The tube 102 extends outwardly of each of the plates 94, 96 to form end stubs 104, 106 adapted to be connected to conduit means within the exhaust system of an internal combustion engine.

A single helical baffle 108 supportingly received on the outer circumference of the inner tube 102 has its outer edge extending radially to tube 92 and is wound from the end plate 94 to the end plate 96 to define a helically formed passage 110 around the inner tube 102 which has an inlet end 112 and an outlet end 114 thereon.

In the illustrated embodiment, the cross-sectional flow area of the passage 110 is substantially equal to the cross-sectional flow area through the inner tube 102. As in the case of the embodiments in FIGS. 1 thru 3, a first set of holes 116 is formed in the inner tube at the inlet end 112 of the outer path 110. The set of holes 116 has a cross sectional flow area substantially equal to the cross sectional flow area of the tube and serves to define a substantially unrestricted communication between the interior of the tube 102 and the passageway 110.

The tube further includes a second set of holes 118 therein located at a point offset downstream of the midpoint of the inner tube 102 between the end plates 112, 114. The holes 118 have a total cross-sectional flow area substantially equal to the cross-sectional flow area through the tube 102 and defines an unrestricted communication between an intermediate point 120 in the helical path 110 that represents the outlet of a first acoustical path portion of the passage 110 that has a length greater than the acoustical path within the inner tube 102 between the set of holes 116 and the set of holes 118 to produce attenuation of a first sound frequency range by wave interference.

The spaced apart set of holes 116, 118 thereby serve to intercommunicate first and second acoustical paths without restricting mass flow of exhaust through the inner pipe 102. The attenuation is produced without the presence of an abrupt change in the mass flow of exhaust through the pipe 102 so that pressure drop across the noise attenuating flow paths is minimized.

The device includes a third set of holes 122 therein located adjacent the outlet 114 and the baffle 108 having a cross-sectional flow area substantially equal to the cross-sectional flow area through the inner tube 102. The set of holes 122 cooperates with the set of holes 118 to define a second acoustical flow path through the inner tube 102 that is shorter than a second acoustical flow path formed between the region 120 of the helical outer path 110 and the outlet 114 thereof to define a second sound attenuation by wave interference in the silencer 90 by use of a single continuous inner tube therethrough. By virtue of this construction, all cavities within the sets of holes 116, 118, 122 are like the hole sets 58, 64 in the first embodiment and are grouped and offset to produce unrestricted sound intercommunication between tube 102 and passage 110 without producing an abrupt inlet opening to the wave interference sections as found in existing wave interference devices.

A third embodiment of the invention is illustrated in FIGS. 5 and 6. In this embodiment, a silencer 124 is illustrated like silencer 90. It includes an outer tube 126 with opposite ends thereof closed by flat end plates 128, 130 respectively. In this embodiment a hole set 132 is formed in an inner tube 134 from the flat end plate 128 to a point inwardly of the end of tube 126. A helical baffle 136 wound on the outer circumference of tube 134 has its outer edge extending radially to tube 128 to define a helically formed passage 138 constituting an outer acoustical path for wave interference attenuation of sound. The hole set 132 includes four circumferential spaced rows. The first row 140 is located forwardly of the inlet end 141 of baffle 136 which abuts against the flat plate 128 for ease of assembly. Row 142 is located to be intersected by the first turn 144 in baffle 136 and rows 146, 148 are located in passage 138 between the first baffle turn 144 and a second downstream baffle turn 150. They combine to form an acoustical path to the outer passage 138 which has a hole pattern similar to 132 at acoustical exits and in acoustical entrances (not shown) at locations like those at 118, 122 in FIG. 4 to define a desired wave interference action between opposite ends of silencer 124 to attenuate a wide range of sound frequencies without excessive pressure drop thereacross. Inner tube 134 has opposite ends 152, 154 thereon supported in bores 156, 158 in plates 128, 130 respectively. Each end 152, 154 extends axially outwardly of tube 126 for connection in an exhaust system.

While the embodiments of the present invention, as herein disclosed, constitute a preferred form, it is to be understood that other forms might be adopted.

What is claimed is:

1. An improved silencer assembly comprising: an outer tube, an inner tube having opposite open ends thereon defining an inner acoustical path, a closure member connected between said outer tube and said inner tube to define a chamber at one end of said outer tube, a helical baffle formed between said inner tube and said outer tube defining an outer acoustical path between said inner tube and said outer tube having a length in excess of the length of said inner tube between said opposite open ends thereof, said outer acoustical path including an inlet at said chamber and an outlet at the outlet of said inner tube, said inner tube including a plurality of holes therein at one open end thereof located at said chamber for exhaust flow between said inner and outer acoustical paths to direct a predetermined portion of the exhaust flow from said inner tube through the inlet of said outer acoustical path and to provide a transparent area at a sound interaction point between the inner acoustical path through the inner tube and the outer acoustical path through the helical baffle to produce sound attenuation by wave interference with reduced turbulence produced noise at the sound interaction point between the inner and outer acoustical paths, said inner tube being imperforate between said plurality of holes and the opposite open end thereof to reduce exhaust flow pressure loss between the opposite open ends of said inner tube.

2. A wave interference silencer comprising: an outer tube having an end plate on either end thereof, means defining a bore in each of said end plates, an inner tube directed through one of said bores to be supportingly received thereon to locate said inner tube concentrically of and radially inwardly spaced to said outer tube, said inner tube being open throughout its length to define a primary exhaust flow path therethrough, a helical baffle located between said inner and outer tubes extending along the outer circumference of said inner tube, said helical baffle defining a curvilinear exhaust flow passage and a first acoustical path having an inlet and an outlet, said inner tube including a first set of holes therein acoustically communicating the inner tube with the inlet to said first acoustical path, said set of holes having a total cross-sectional flow area at the inlet of said first acoustical path substantially equal to the cross-sectional flow area through said inner tube and the cross-sectional flow area through said baffle passage to produce unrestricted noise interaction between said inner tube and said curvilinear exhaust flow passage, means defining an outlet from said inner tube at the outlet of said first acoustical path, said set of holes and inner tube outlet defining a second acoustical path through said inner tube having a length less than that of said first acoustical path to produce wave interference attenuation of sound frequencies in exhaust flow through said inner tube and said curvilinear exhaust flow passage, said inner tube being imperforate between said first set of holes and said inner tube outlet to maintain the primary flow of exhaust flow through said inner tube with reduced exhaust flow pressure drop therethrough.

3. A wave interference silencer comprising: an outer tube having an end plate on either end thereof, means defining a bore in each of said end plates, a single inner tube directed through the length of said outer tube having portions thereon supportingly received within the end plate bores to locate said single inner tube concentrically of and radially inwardly spaced to said outer tube, said inner tube being open throughout its length to define a primary exhaust flow path therethrough, a helical baffle located between said inner and outer tubes extending along the outer circumference of said inner tube between the opposite end plates of said outer tube, said helical baffle defining a curvilinear passage and a first acoustical path having an inlet and an outlet, said inner tube including a first set of holes therein defining the inlet of a second acoustical path through said inner tube and communicating the inner tube with the inlet to said first acoustical path, said first set of holes having a total cross-sectional flow area at the inlet of said first acoustical path substantially equal to the cross-sectional exhaust flow area through said inner tube and the cross-sectional flow area through said curvilinear passage to produce unrestricted noise interaction between said inner tube and said curvilinear passage, means defining a second set of holes in said inner tube spaced downstream of said first set of holes therein to define the outlet of the second acoustical path through said inner tube, said second acoustical path having a length less than that of said first acoustical path, said second set of holes having a total cross-sectional flow area substantially equal to the cross-sectional flow area through said inner tube and said curvilinear passage, said second set of holes producing unrestricted noise interaction between said first and second acoustical paths to attenuate a predetermined range of sound frequencies, said inner tube being inperforate between said first and second set of holes to direct a primary flow of exhaust fluid through said inner tube with reduced exhaust flow pressure drop therethrough.

4. A wave interference silencer comprising: an outer tubular member having an end plate on opposite ends thereof, each of said end plates including a bore therethrough, a single inner tube supportingly received within each of said bores and extending axially through said outer tube in radially inwardly spaced relationship therewith, said inner tube having opposite ends thereon extending outwardly of said outer tube and adapted to be connected to conduits of an engine exhaust system, said inner tube being open throughout its length to define a primary exhaust flow path therethrough, a helical baffle located between said inner and outer tubes extending along the outer circumference of said inner tube along the length thereof between said outer tube end plates, said baffle defining a helically formed acoustical flow path having an inlet and an outlet end thereto, a first set of holes formed in said inner tube at the inlet to said helical acoustical path having a cross-sectional flow area substantially equal to the cross-sectional flow area through said inner tube, a second set of holes in said inner tube spaced axially from said first set of holes at the outlet of said helical acoustical path to define the outlet of a second acoustical path through said inner tube, said first acoustical path having a length greater than said second acoustical path, said first and second sets of holes intercommunicating said first and second acoustical paths to produce a predetermined wave interference attenuation of sound frequencies directed through said inner tube, said inner tube being imperforate between said first and second sets of holes to maintain an uninterrupted mass flow of exhaust through said inner pipe so as to reduce pressure drop between the opposite ends of said inner pipe during exhaust flow therethrough.

5. A wave interference silencer comprising: an outer tubular member having flat end plates on opposite ends thereof, each of said flat end plates including a bore therethrough, a single inner tube supportingly received within each of said bores and extending axially through said outer tube in radially inwardly spaced relationship therewith, said inner tube having opposite ends thereon extending outwardly of said outer tube and adapted to be connected to conduits of an engine exhaust system, said inner tube being open throughout its length to define a primary exhaust flow path therethrough, a helical baffle located between said inner and outer tubes extending along the outer circumference of said inner tube along the length thereof between said outer tube end plates, said baffle having the ends thereof in abutment with said flat end plates and defining a helically formed acoustical flow path having an inlet formed between first and second turns of said baffle and an outlet, a first set of a plurality of rows of holes formed in said inner tube, at least one of said rows being located between one of said end plates and said first turn, the other of said rows being located between said first and second turns at the inlet to said helical acoustical path, said set of holes having a total cross-sectional flow area substantially equal to the cross-sectional flow area through said inner tube, a second set of holes in said inner tube spaced axially from said first set of holes at the outlet of said helical acoustical path to define the outlet of a second acoustical path through said inner tube, said first acoustical path having a length greater than said second acoustical path, said first and second sets of holes intercommunicating said first and second acoustical paths to produce a predetermined wave interference attenuation of sound frequencies directed through said inner tube, said inner tube being imperforate between said first and second sets of holes to maintain an uninterrupted mass flow of exhaust through said inner pipe so as to reduce pressure drop between the opposite ends of said inner pipe during exhaust flow therethrough.

* * * * *